United States Patent [19]

Stearns et al.

[11] 4,192,731

[45] Mar. 11, 1980

[54] COAL EXTRACTION PROCESS

[75] Inventors: Richard S. Stearns, Malvern, Pa.; Elmer J. Hollstein, Wilmington, Del.

[73] Assignee: Suntech, Inc., Philadelphia, Pa.

[21] Appl. No.: 918,216

[22] Filed: Jun. 23, 1978

[51] Int. Cl.$^2$ .............................................. C10G 1/00
[52] U.S. Cl. ................................................. 208/8 LE
[58] Field of Search ..................................... 208/8 LE

[56] References Cited

U.S. PATENT DOCUMENTS

| | | | |
|---|---|---|---|
| 3,379,638 | 4/1968 | Bloomer et al. | 208/8 LE |
| 3,558,468 | 1/1971 | Wise | 208/8 LE |
| 3,966,585 | 6/1976 | Gray et al. | 208/8 LE |
| 3,983,027 | 9/1976 | McCollum et al. | 208/8 LE |
| 4,039,425 | 8/1977 | Neavel | 208/8 LE |
| 4,077,866 | 3/1978 | Owen et al. | 208/8 LE X |

FOREIGN PATENT DOCUMENTS

| | | |
|---|---|---|
| 835217 | 1/1976 | Belgium . |
| 835286 | 1/1976 | Belgium . |
| 1261707 | 1/1972 | United Kingdom ............... 208/8 LE |

*Primary Examiner*—Delbert E. Gantz
*Assistant Examiner*—William G. Wright
*Attorney, Agent, or Firm*—J. Edward Hess; Donald R. Johnson; Paul Lipsitz

[57] ABSTRACT

Coal and other solid fossil fuels are subjected to supercritical gaseous extraction by heating a mixture of particulate coal and a solvent mixture of tetralin and xylene at supercritical temperature whereby high extractive yield is obtained and the residual solid material is easily separated from the liquid product.

5 Claims, No Drawings

COAL EXTRACTION PROCESS

It is known in the art to employ supercritical gaseous extraction for obtaining liquids from coal or other solid fossil fuels. Such a process requires that particulate coal be placed in contact with an appropriate solvent held above its critical temperature. In Belgium Pat. No. 835,217 there is disclosed the use of one or more of various solvents such as aromatic solvents (benzene, toluene, xylene, etc), cycloaliphatic hydrocarbons, acyclic aliphatic hydrocarbons, and phenols to effect coal solubilization under super critical conditions. In Belgium Pat. No. 835,286 an improved process is described where, in addition to the solvents above described, an additive such as tetralin, tetrahydroquinoline and o-cyclohexylphenol is used at a weight ratio of tetralin to toluene of 10:90 in order to improve yield of extract. Thus, at about 380° C. with tetralin as an additive to a toluene solvent yield is increased from 19% to about 23%. When the extraction temperature was increased to 420° C. a yield of 35.5% was obtained with tetralin and 27.4% without. A process using toluene as solvent is described by Keith D. Bartle et al in an article appearing in *Fuel,* Vol. 54, page 226 (1975). That technique utilizes compressed gases to volatilize high-boiling materials and effect their separation from a non-volatile residue, and is applied to coal undergoing mild pyrolysis to extract the liquids which are formed. The liquids are readily recovered by condensation from the gas phase. Since the extraction takes place at temperatures below those at which volatile matter is evolved by destructive distillation, extensive thermal degradation of the coal is avoided. The extract may therefore be representative of the lower-molecular-weight fractions of the coal.

While the yield is improved by the techniques of the above mentioned patents, further improvement in yield is needed. Also, the solid residue from the process is often difficult to separate as it loses its particulate form and cannot be filtered or otherwise easily separated from the liquid product or from the reactor. The present invention gives good yields of hydrocarbon liquids and also permits the residual solid to retain its particulate form for easy separation.

In accord with the invention, coal or other solid fossil fuel is subjected to supercritical gaseous extraction by heating a mixture of the particulate solid and a solvent mixture of from about 50% to about 75% by weight of tetralin and about 50% to about 25% by weight of xylene at supercritical temperature. As will be shown in the subsequent data which follows, it is essential to the proper operation of the process that the solvent mixture be as defined above.

The particulate fossil fuel material with which the process of the invention can be used is exemplified by coal, shale, lignite, tar sands and the like. The liquid hydrocarbon products obtained from the process will have a relatively high hydrogen content and may be used directly as a fuel or further refined to yield a variety of hydrocarbon products, including jet fuel.

In carrying out the process the particulate fossil fuel, generally having a particle size of 4 to 30 mesh (preferably about 10 to about 20 mesh) is placed in a pressure vessel and the solvent mixture added. For caking coals such as Illinois 6 an agitated reactor should be used. The weight ratio of coal to solvent mixture will generally be from about 0.1:1.0 to 1:1, preferably about 1:1. As indicated, the ratio of tetralin to xylene in the solvent mixture will be from about 50:50 to about 75:25 by weight and it will be understood that the preferred ratio will depend upon the particular fuel material used. Thus, for Wyodak coal, for example, the preferred ratio is 75:25. Any one of the xylenes or an admixture of the isomeric xylenes may be employed with the tetralin component.

The reaction should be carried out in the absence of any significant amount of hydrogen because the presence of hydrogen will tend to reduce the effectiveness of the process to retain the physical integrity of the solids.

The reactor containing the particulate material and solvent is sealed, purged with nitrogen and heated without agitation to a temperature of from about 325° C. to about 425° which is above the critical temperature of the solvent. The temperature should be above the critical temperature, but as close to it as reasonably possible and, of course, the particular solvent mixture will determine the actual temperature to be used. After holding on temperature for an appropriate time to effect maximum solution (usually several hours, but which may be more or less depending on the volume of the solid treated) the reactor is cooled, vented and opened. The residual solid material retains its particulate character and is readily separated by filtration and may be washed with a solvent to remove entrapped and adhering hydrocarbons, the wash being added to the filtrate for further processing. The filtrate is distilled to remove the solvent and the remaining liquid is the fossil fuel dervied product which, as indicated above, may be used directly or processed further by conventional means.

Alternatively, the product liquids and solvent may be taken overhead and the solvent removed by conventional distillation or the product may be separated from the solvent after effecting a phase separation by cooling. This latter method is preferred because of its favorable heat balance.

In addition to the relatively high yield of liquid product obtained and the ease of separating residual solids, other advantages accrue from the process. It has been observed that generally the recovered liquid from the process of the invention has a higher hydrogen to carbon ratio than that obtained by the conventional solvent refined coal process. For example, liquids from solvent refined coal have a hydrogen to carbon ratio equal to or slightly less than the coal being processed (e.g. 0.84 with Ill. No. 6; 0.76 with Wyodak coal) whereas, the liquid obtained by the instant process has a C/H ratio generally of about 1.0. Another advantage of the process of the invention resides in the relative absence in the product of light hydrocarbons in the $C_1$ to $C_4$ range. Still a further advantage of the process is that it is operated at relatively low pressures, i.e. under 1500 psi in the extraction unit. Also, the residue has a high BTU content and because of its high surface area is quite useful for gasification.

In order to further illustrate the invention, the following examples are given:

Following the general process details set out above, Wyodak coal of 10 to 30 mesh and solvent was placed in an 800 ml. autoclave and purged with nitrogen after sealing. The autoclave was then heated to a temperature of 425° C. which was above the critical temperature of the solvent. It was held at that temperature for two hours, cooled to room temperature, vented and opened. The products were filtered and the recovered solids were washed with a solvent to remove entrapped and adhering hydrocarbons. (Tests indicated that this wash procedure did not extract hydrocarbons from the coal at room temperature.) The wash was added to the filtrate and solvent was removed by distillation. A material balance included a weight determination of all gases, water, liquid hydrocarbons, and solids, and solids which were produced. Major losses were attributed to the distillation step. Table 1 is a summary of pertinent data obtained:

As can be seen from the data in the Table 1 when xylene is used alone as the solvent, the residual solids retain their physical integrity and are easy to separate, but the conversion to useful products is quite low, being only 24% (Example 1). On the other hand, when tetralin is used alone (Ex. 9) conversion is satisfactory, but the residual particles are difficult to separate. Even though a mixture of xylenes and tetralin is used as solvent, rather low conversion and recovery is obtained when the tetralin-xylene-ratio is below 50:50 (Ex. 2) and when the ratio is above 75:25, separation of the residual particles is difficult (Exs. 6,7 and 8). Only when the tetralin-xylene ratio is at least about 50:50 is conversion and recovery high and particle separation easy. Also to be noted in Example 13 where the temperature is below supercritical resulting in a very low conversion (9%).

The invention claimed is:

1. A process for obtaining liquids from solid fossil fuels by heating at super critical temperature in the absence of added hydrogen a mixture of particulate solid fossil fuel and a solvent mixture of from about 50% to about 75% by weight of tetralin and from about 50% to about 25% of xylene whereby said solid fuel is extracted and the solid residue retains its particulate form.

2. A process for obtaining liquids from coal by heating in the absence of added hydrogen at a supercritical temperature between about 325° C. and about 425° C. a mixture of particulate coal of from about 4 to about 30 mesh and from about 50% to about 75% by weight of tetralin and from about 50% to about 25% by weight of xylene whereby said coal is extracted to yield liquid hydrocarbon products and the solid residue retains its particulate form.

3. The process of claim 2 wherein the coal is Wyodak coal and the solvent mixture is about 75% by weight of tetralin and about 25% by weight of xylene.

4. The process of claim 3 wherein the particulate coal is between about 10 and 30 mesh.

5. The process of claim 4 wherein the reaction temperature is about 425° C.

* * * * *

TABLE 1

| Ex. No. | Solvent Type | Solvent wt. (gms) | Wyodak Coal wt. (gms) | Temp. (°C.) | Max. Press. (PSIG) | Products, gms. Gases | H₂O | Liq. | Solids | Recovery (wt. %) | Conversion (Wt. %) | H/C Ratio of Liq. Product | Physical State of Recovered Solids |
|---|---|---|---|---|---|---|---|---|---|---|---|---|---|
| 1 | 1 | 100 | 100 | 425 | 1375 | 14.8 | 2.0 | 3.6 | 78.2 | 98.6 | 24 | 1.09 | A |
| 2 | 2 | 100 | 100 | 425 | 1365 | 16.6 | 3.0 | 6.4 | (64.0) | 90.0 | 40 | 1.10 | A |
| 3 | 3 | 100 | 100 | 425 | 1380 | 16.7 | 4.0 | 19.0 | (59.1) | 98.8 | 46 | 1.01 | A |
| 4 | 3 | 100 | 100 | 425 | 1375 | 17.4 | 3.5 | 19.0 | 59.2 | 99.1 | 46 | 1.06 | A |
| 5 | 4 | 100 | 100 | 425 | 1275 | 17.0 | 4.7 | 19.6 | 49.2 | 90.5 | 57 | 1.03 | A |
| 6 | 5 | 100 | 100 | 425 | 1240 | 16.9 | 4.3 | 22.7 | 44.7 | 88.6 | 62 | 1.13 | B |
| 7 | 6 | 100 | 100 | 425 | 1275 | 16.8 | 5.7 | 24.0 | 44.3 | 90.8 | 62 | 0.98 | B |
| 8 | 7 | 100 | 100 | 425 | 1325 | 19.9 | 6.0 | 21.1 | 45.6 | 92.6 | 61 | 0.97 | B |
| 9 | 8 | 100 | 100 | 425 | 1380 | 23.5 | 3.9 | 25.4 | 41.7 | 94.5 | 65 | 0.94 | B |
| 10[1] | 4 | 100 | 100 | 425 | 1325 | 17.6 | 7.0 | 25.9 | 43.0 | 93.5 | 64 | 0.97/0.88 | A |
| 11[2] | 4 | 100 | 100 | 425 | 1250 | 14.8 | 5.7 | 18.0 | 46.4 | 84.9 | 60 | 1.16 | A |
| 12 | 4 | 100 | 100 | 390 | 1065 | 10.7 | 0.0 | 26.4 | 49.3 | 86.4 | 57 | 1.09 | A |
| 13 | 4 | 100 | 100 | 300 | 250 | 4.0 | 0.0 | 5.4 | 92.3 | 101.7 | 9 | 1.52 | A |

Solvent Code
1 = Xylenes
2 = 25 gms. Tetralin, 75 gms. Xylene
3 = 50 gms. Tetralin, 50 gms. Xylene
4 = 75 gms. Tetralin, 25 gms. Xylene
5 = 80 gms. Tetralin, 20 gms. Xylene
6 = 82.5 gms. Tetralin, 17.5 gms. Xylene
7 = 85 gms. Tetralin, 15 gms. Xylene
8 = 100 gms. Tetralin Physical State Codes
A = Solids retained physical integrity (Easy to separate)
B = Solids reduced to powder (Difficult to separate)

Notes
[1] Two extractions made on same solids.
[2] Vapors collected in overhead system (data shown are total yields from vapor collector and reactor).